Patented Nov. 23, 1943

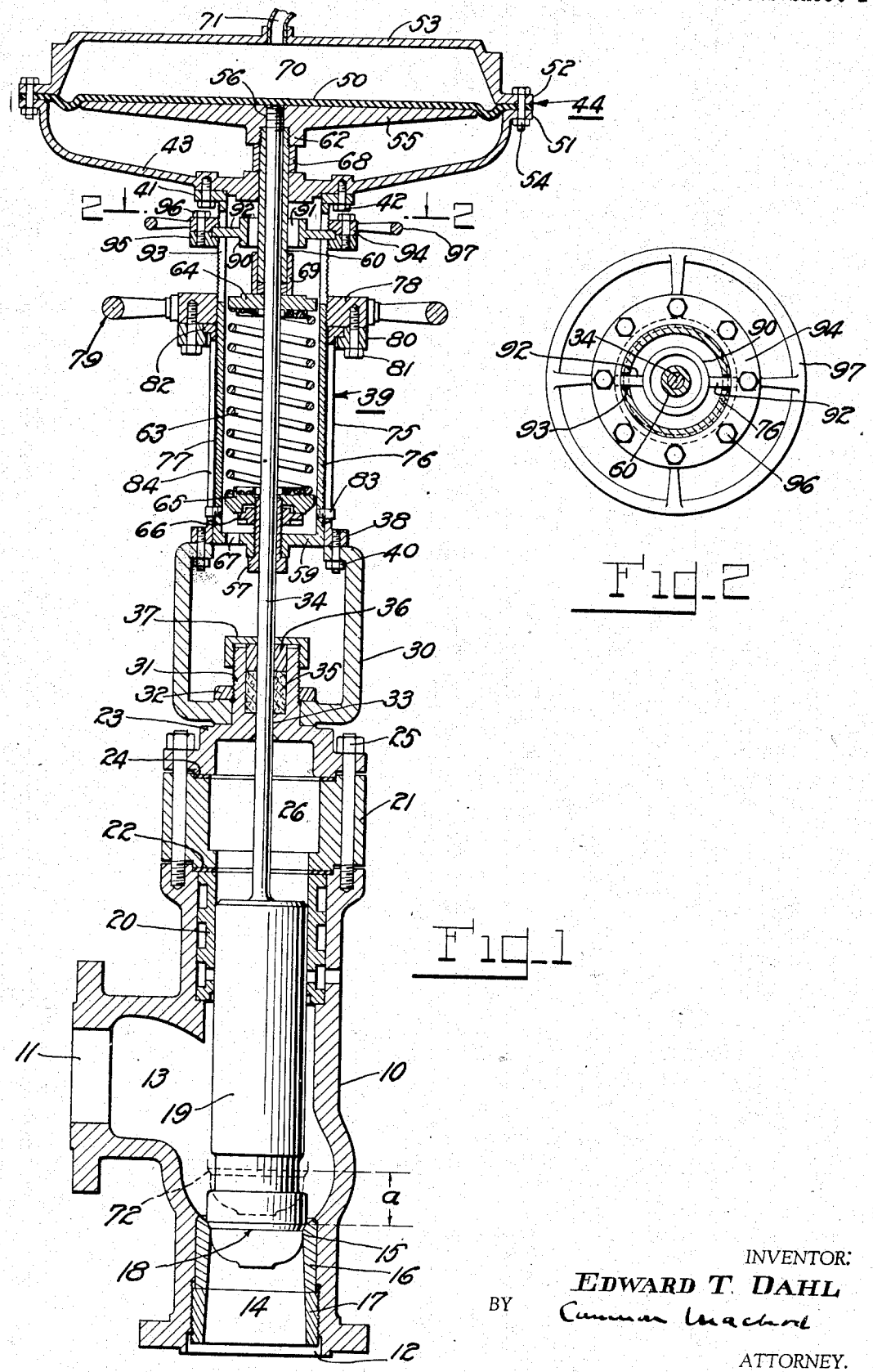

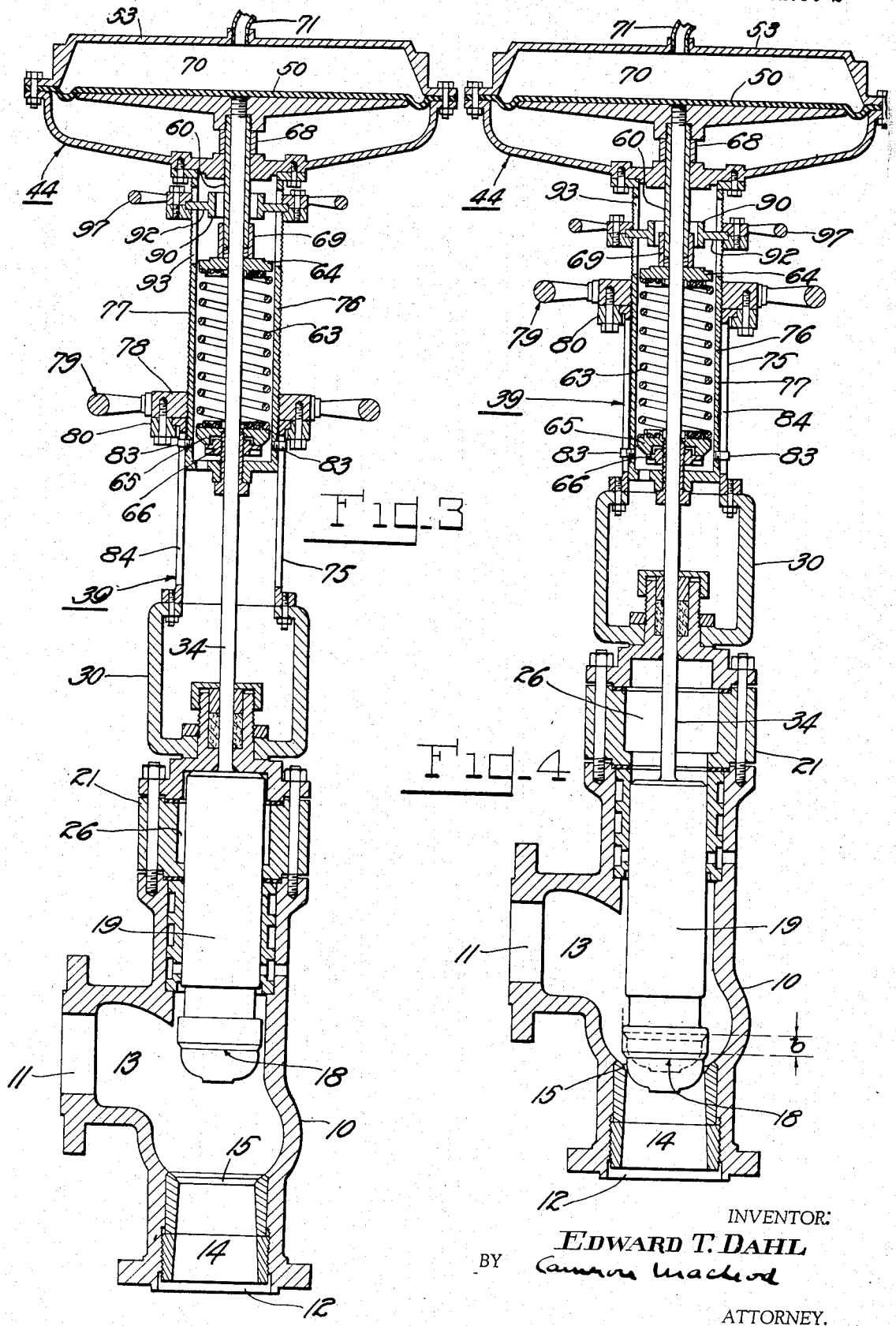

2,335,143

UNITED STATES PATENT OFFICE 2,335,143

CONTROL VALVE

Edward T. Dahl, Abington, Mass., assignor to Mason-Neilan Regulator Co., Boston, Mass., a voluntary trust of Massachusetts Application March 12, 1941, Serial No. 382,972

13 Claims. (Cl. 137—153)

This invention relates to an improvement in valves for controlling the flow of fluids or other media, wherein flow through a restricted port is governed by a valve member which is positioned in relation thereto, and the invention is particularly adapted for use in connection with automatic control valves. The device embodying my invention may be used to place the valve on hand control, when it seems desirable to do so, or, when operated automatically, to vary the maximum valve opening or the minimum valve opening, or, in other words, the position of the range of valve movement in relation to the valve port.

In the control of flow of some fluids, extraneous matter, such as solids, have a tendency to form and lodge between the valve member and the valve seat or body of the valve which interfere with the movement of the valve plug or with the fluid flow. While the valve port may be of a size which is sufficient to allow the solid to pass through the valve, the clearance required between the valve member and the valve body or seat for maximum valve capacity is less than that of the port diameter and, at this point, a restriction is presented for solids or other extraneous matter to lodge. As an illustration, in the control of oil pressure on a pipe still heater by means of an automatic back pressure valve, the hydrocarbons tend to crack and solidify at various points along the pipe line creating lumps of solid matter which occasionally break loose and become lodged in the valve. When solids become lodged in this manner, they may interfere with the valve movement or interrupt the flow of hydrocarbon fluid, sometimes with disastrous results, unless the valve is quickly by-passed or the heater is shut down. The valve must then be taken apart and the solid removed. A valve for the control of back pressure on a pipe still heater is illustrated in my application for United States patent, Serial No. 189,950 filed February 11, 1938, for Apparatus for the control of hydrocarbons, now Patent No. 2,277,075, dated March 24, 1942. The mechanism embodied in this invention is intended for use with a valve in general of the type therein illustrated or with any other type of valve in which a valve member or plug is moved in relation to a valve port by a suitable motor over a predetermined range.

As is well known to those skilled in the art, automatic valves are commonly provided with servo-motors, operated either electrically or by fluid pressure, to position the valve plug in relation to the port from closed to full open position as may be required to regulate the flow within the capacity of the valve. When electric motors are employed they are usually arranged to impart a predetermined movement to the valve member suitable to the size and type of valve to which they are applied. When fluid operated motors are used they are also arranged for this purpose and may comprise a piston, responsive to changes in fluid pressure in a cylinder or, as is illustrated in the accompanying drawings, may employ a diaphragm which is urged in one direction by a spring against the pressure of a suitable operating fluid, variations in which are adapted to position the valve member in relation to the valve port over a predetermined operating pressure range. In the diaphragm type of motor it is customary to size the diaphragm and diaphragm chamber in accordance with certain definite standards as required by the type of valve and the operating conditions. The diaphragm must have an effective area which is adapted to afford ample power under small changes of operating pressure and the flex of the diaphragm must be sufficient to accommodate the maximum valve lift needed for full valve capacity. On the other hand, the diaphragm and diaphragm chamber should not be any larger than necessary because of the space required, the additional weight of parts and the expense involved. To avoid undue strain on the diaphragm and its operating parts it is usual to provide limiting stops by which the valve movement is restricted within a range which is normally just sufficient to control the flow of fluid within the capacity of the valve. In other words, more or less definite standards for diaphragm motors are adhered to depending on the pressure of the operating fluid, the type and size of valve and the control conditions.

It is an object of this invention to provide a control mechanism which may be used in combination with an automatic valve to increase temporarily the valve lift while the valve is on stream in order to clear foreign matter which is larger in size than the normal maximum clearance between the valve plug and seat or body, and by which the valve member may be returned to its normal operating position in relation to the port without disturbing the parts of the valve body or motor.

I have found it desirable under certain operating conditions to vary the range of automatic valve movement to establish either a minimum valve opening or a maximum valve opening or both or, in other words, to vary the limits of the range of valve movement imparted by the motor and to position that range of movement within the normal automatic range as desired. It is a further object of this invention to provide a simple and relatively inexpensive mechanism for accomplishing these purposes.

It is still another object of this invention to provide means which, additionally to the purposes hereinabove referred to, may be employed to operate the valve by hand whenever hand operation is deemed necessary.

It is still a further object of this invention to provide a device which lends itself to a motor valve of standard construction and which may be applied to the valve without any change in the valve body, motor, or operating connections, by substituting the device for an intermediate member commonly used in standard construction, and in some cases as, for example, in the type of valve herein disclosed, by adding one additional member to the intermediate structure.

The above and other objects and advantages of this invention will be more fully understood from the following description when taken in connection with the accompanying drawings forming a part of this specification, in which:

Fig. 1 is a vertical section of a control valve embodying the present invention, the valve being shown in closed position with full loading pressure on the diaphragm.

Fig. 2 is a horizontal section taken on line 2—2 of Fig. 1; and

Figs. 3 and 4 are views similar to Fig. 1, but showing different adjustments of the parts.

Having reference to the drawings, there is shown a combined motor and hand-operated control valve of the angle type, which is particularly adapted for the control of hydrocarbons or similar medium, but it will be understood that this particular valve is used by way of illustration only and that the invention is not limited to any special type of valve structure. The valve body 10 may have inlet and outlet openings 11 and 12 respectively, which are adapted for connection to suitable inlet and discharge pipe, not shown, wherein it is desired to control the flow of fluids or equivalent media in response to variations in control pressure. The body may also be provided with an inlet chamber 13 and an outlet chamber 14, communication between which is established by means of a port 15, herein shown as defined by a venturi-shaped member 16, which is arranged to discharge into an outlet member 17 threaded into the body. Cooperating with the port 15 is a valve member 18, herein shown as of a parabolic type, having a cylindrical shank 19, which is slidably mounted in a liner 20 secured within the body 10 and arranged so that the valve member is adapted to be moved toward and away from the port to govern flow through the valve. For the particular type of body herein illustrated, a cylindrical spacer 21 is provided having a raised face 22 at its lower end which is arranged to fit into a corresponding recess in the body 10. The upper end of the spacer 21 has a bonnet 23 which is also provided with a raised face 24 adapted to be received within an annular recess in the spacer member, the parts being rigidly attached together and to the body 10 by studs and nuts 25 to provide a pressure tight chamber 26 within which the shank 19 of the valve member is adapted to extend when the valve member is given the maximum lift permitted by the valve body as, for example, is indicated in Fig. 3.

The valve may also be provided with a yoke 30 which is supported on the bonnet 23 and is secured thereto by means of a tubular extension 31 on the bonnet, the extension being arranged to project through a suitable opening in the yoke and being rigidly attached thereto by a threaded nut 32. At the lower end of the extension 31 is an opening 33 to receive a valve stem 34 which is herein shown as forged in one piece with the plug 18. The valve stem is slidably mounted in the bonnet tubular extension 31 and makes a pressure tight connection therewith by means of suitable packing 35 compressed by a follower 36 which is engaged by a nut 37 threaded over the extension. The upper end of the yoke 30 is rigidly secured to the lower flange 38 of a spacing device, indicated generally at 39 and more fully hereinafter to be described, by means of studs and nuts 40, the upper flange 41 of the spacing device being connected by stud bolts 42 with the lower diaphragm chamber member 43 of a valve motor generally indicated at 44.

The valve motor may comprise a flexible diaphragm 50, secured at its edge between flanges 51 and 52 of the lower diaphragm chamber member 43 and an upper diaphragm chamber member 53, respectively, by means of bolts 54. Beneath the diaphragm 50 is a plate 55 which is connected by threads 56 to the stem 34. The stem 34 is slidably mounted in a guide bushing 57, threaded into the bottom plate 59 of spacing device 39, and extends through a tubular spacer 60 slidably mounted in the lower diaphragm chamber member 43 and threaded at its upper end into a boss 62 on the plate 55. Within the spacing device 39 is a multiple spring 63 which biases the diaphragm 50 upwardly and for this purpose is retained between spring buttons 64 and 65, through which the stem 34 extends, the upper button 64 being in engagement with the tubular spacer 60 and the lower button 65 being mounted on the guide bushing 57 by means of a castellated nut 66 which may be adjusted through a suitable opening 67 to vary the spring tension.

To limit the valve member movement within a predetermined range suitable to the capacity of the valve and to the flex of the diaphragm 50, I provide limiting stops 68 and 69 which may be in the form of tubular members adapted to fit over the spacer 60. Member 68 is disposed at the upper end of the spacer 60, between the plate 55 and the diaphragm chamber member 43, and limits the downward movement of the diaphragm, and member 69 is at the lower end of the spacer, between the spring button 64 and the chamber member 43, and serves to limit the upward movement of the diaphragm.

The upper diaphragm chamber member 53 and diaphragm 50 define a pressure chamber 70 which may be connected by means of a flexible pipe 71 to a source of operating fluid under pressure the variations of pressure in which are responded to by corresponding diaphragm movements. It will be understood that the pressure of the operating fluid may be governed by a suitable instrument, not shown, or other control responsive to changes in the value of a condition being governed or, as in some valves, the diaphragm chamber 45 may be connected directly to the controlled pressure, a common method employed in direct operated reducing or back pressure valves. It will be noted from the above that movement of the diaphragm 50 is communicated directly to the valve plug 18 and that under usual operating conditions, the plug is moved by the motor 44 over a range defined by the stops 68 and 69 from closed position to a position of maximum valve capacity. Such a range of movement is shown at *a* in Fig. 1, and may extend from a position at which the valve member is on its seat to a position indicated at 72 in dotted lines.

The spacing device 39 may be of tubular construction to provide both a casing for the spring 63 and a support for the valve motor 44. In the arrangement shown, it comprises tubular members 75 and 76, arranged in telescopic relation, the outer member 75 being provided with the flange 38 and the inner member 76 having the bottom plate 59 at its lower end and the flange 41 at its upper end, all as referred to hereinabove. The inner member 76 is threaded externally, as indicated at 77, to cooperate with a threaded collar 78 forming the hub of a hand wheel 79, and is provided with a ring 80 to which it is attached by studs 81, the ring having an annular recess within which is received a flange 82 at the upper end of the outer member 75. It will be noted from the above that the inner member 76 may be raised in relation to the outer member 75 by rotating the hand wheel 79 in one direction and may be lowered in relation to the outer member by rotating the hand wheel in the opposite direction. To prevent relative rotary movement of the spacing device members, the inner member is provided with pins 83 which are received within corresponding slots 84 in the outer member; thus, when the inner tubular member 76 is raised, the motor 44 with its associated operating parts, including the diaphragm 50, spring 63 and stem 34, are also raised and lift the plug 18 to any desired position in relation to the valve port 15. By this means, the plug 18 may be raised beyond the normal position of maximum automatic lift, shown in dotted lines at 72 in Fig. 1, to a position shown in Fig. 3, to permit an obstruction to pass through the port 15, and thereafter the plug may be returned to its original position. Furthermore, if it is desired to prevent complete closure of the valve by the motor 44, the spacing device member 76 may be lifted to a predetermined position in relation to the outer member 75 and thus a minimum valve opening may be established or, in other words, the automatic range position of the valve member may be varied in relation to the port 15.

Where high fluid pressures are encountered, it is becoming modern practice to forge the valve plug in one piece, as herein shown, instead of using a two-piece stem connected by a coupling which may be a source of weakness. Inasmuch as a coupling has commonly been used to provide means for adjusting the stem length to enable the valve member to be set in proper relation to its seat, the use of a stem and plug forged in one piece adds to the difficulty of valve adjustment especially if such adjustment is required after the valve has been installed. By means of the hand wheel 79, the valve plug 18 may be adjusted at any time in relation to the port 15 to insure a tight shut-off when full operating pressure is applied to the diaphragm.

It will be understood from the foregoing that the hand wheel 79 serves both as a convenient means, not only for raising the valve member 18 to a position of maximum lift, to permit the passage of extraneous matter which would otherwise lodge in the valve, but to establish a minimum valve opening.

Under some conditions of automatic control, such as the regulation of pressure on a pipe still heater, it may be desirable to establish, not only a minimum valve opening, but also a maximum valve opening for automatic control to maintain a reasonable factor of safety in the operation of the still. To provide means for limiting the valve lift to a selected point within the normal operating range of the diaphragm 50, I preferably employ an adjustable ring stop 90, which surrounds the spacer 60, and has a central opening 91 of sufficient size so that the spacer and stop 69 may freely move therethrough. Secured to the ring stop 90 are pins 92 which extend through vertical guide slots 93 in the inner tubular spacing device member 76 and are received within an annular recess formed by a pair of split ring flanges 94 and 95 suitably secured together, as by stud bolts 96. Members 94 and 95 are provided with internal threads to correspond with the thread 77 on the inner member 76 and together form the hub of a hand wheel 97 by which the collar may be rotated for the purpose of raising or lowering the ring stop 90 in relation to the spring button 64. The parts are so arranged that when the hub or stop 90 is raised to its uppermost position, as shown in Figs. 1 and 3, the diaphragm movement will be limited by the tubular stops 68 and 69 and the normal maximum range of diaphragm movement will be obtained. When it is desired to limit the range of upward diaphragm movement permitted by the stops 68 and 69, stop 90 is lowered to a position where it will be engaged by the spring button 64 when the valve member 18 is at the selected opening. The setting for maximum and minimum valve openings may be readily accomplished by applying pressure to the diaphragm 50 until the diaphragm is at the limit of its downward movement as permitted by stop 68. Assuming that the hand wheel 79 is so adjusted that the valve plug 18 is seated when diaphragm 50 is at the lower limit of its range of movement, the hand wheel 79 is then turned in a direction to raise the motor 44 until the plug 18 is raised from the port 15 to a selected minimum opening, as may be determined by the relative positions of the inner and outer spacing device members 75 and 76. The stop 90 is then lowered until the distance between the lower face of the stop and the upper face of the spring button 64 is equal to the maximum range of automatic valve movement required. In this manner the range of automatic valve movement may be restricted within any limits desired and the position of the range in relation to the port 15 may likewise be varied to meet the operating conditions. To clarify the above, there is shown at *b* in dotted lines in Fig. 4 a range of valve member movement, the limits of which are within the normal range of automatic valve movement as shown for example at *a* in Fig. 1. At one end of range *b* the closing movement effected by the motor is limited to a selected minimum opening and at the other end of this range the opening movement permitted is limited to a selected maximum opening which is less than the maximum opening normally afforded by the motor. The magnitude of range *b* may be determined by adjusting hand wheel 97 in relation to spring button 64 and the position of range *b* within range *a* may be determined by adjusting hand wheel 79 to vary the position of the lower limit of valve movement, permitted by hand wheel 97, in respect to port 15.

It will be further understood that the hand wheel 79 may be used to operate the valve when hand operation is desirable or when it may become necessary because of motor failure. This may be accomplished by raising stop ring 90 to its uppermost position, in the event that it has been lowered to limit the valve lift, and thereafter by rotating the hand wheel 79 in a direction to lower or raise the motor 44. Even though the operating fluid pressure has failed and the diaphragm 50 is urged to its uppermost position by the spring 63, the inner member 76 may be lowered by the hand wheel 79 until the plug 18 is seated, as the clearance allowed between the hub of the hand wheel 97 and the hub of the hand wheel 79 is sufficient, when the stop is in its uppermost position, for this purpose.

The control mechanism embodying this invention may be combined with any control valve of standard construction to provide an automatic and hand-operated means for controlling flow under a wide variety of conditions. While I have described in detail a preferred form of device, it will be understood that the structure herein described may be modified in various ways without departing from the spirit and scope of my invention.

I claim:

1. In a flow control valve having a body with inlet and outlet openings and a port affording communication between said openings, the combination with a valve member movable relatively to said port for governing flow through said valve, of a valve motor, a spacing device including a member secured to said valve body having a tubular portion, and a member on which said motor is supported having a tubular portion, the tubular portions of said spacing device members being arranged in telescopic relation and having a non-rotatable sliding connection therebetween, means for operatively connecting said motor to said valve member to enable said motor to vary the port opening, and means in operative connection with each of said spacing device members for imparting relative longitudinal movement thereto to vary the port opening.

2. In a flow control valve having a body with inlet and outlet openings and a port affording communication between said openings, the combination with a valve member movable relatively to said port for governing flow through said valve, of a valve motor, a spacing device including a pair of members having tubular portions arranged in telescopic relation with each other and having a non-rotatable sliding connection therebetween, one of said members being connected to the body of said valve and the other of said members being connected to said motor, means for operatively connecting said motor to said valve member to vary the valve opening, and a collar rotatably connected to one of said spacing device members and in operative relation with the other of said members whereby rotation of said collar imparts relative longitudinal movement to said spacing device members to vary the port opening.

3. In a flow control valve having a body with inlet and outlet openings and a port affording communication between said openings, the combination with a valve member movable relatively to said port for governing flow through said valve, of a valve motor, a spacing device including a pair of members having tubular portions arranged in telescopic relation with each other and having a non-rotatable sliding connection therebetween, one of said members being connected to the body of said valve and the other of said members being connected to said motor, means for operatively connecting said motor to said valve member to vary the position of said valve member in respect to said port, and a collar threaded to the tubular portion of one of said spacing device members and rotatably mounted on the tubular portion of the other of said members for imparting relative longitudinal movement thereto to vary the position of said valve member in respect to said port.

4. In a flow control valve having a body with inlet and outlet openings and a port affording communication between said openings, the combination with a valve member movable relatively to said port for governing flow through said valve, of a valve motor, a spacing device including a pair of members having tubular portions arranged in telesscopic relation with each other and having a non-rotatable sliding connection therebetween, one of said members being connected to the body of said valve and the other of said members being connected to said motor, means for operatively connecting said motor to said valve member for varying the position of said valve member in respect to said port, a flange on one of said spacing device member tubular portions, a threaded section on the other of said spacing device member tubular portions, and a collar threaded on said threaded section and rotatably mounted on said flange for imparting relative longitudinal movement to said spacing device members to vary the position of said valve member in respect to said port.

5. In combination with a flow control valve having a control port, a valve member cooperating with said port and adapted to move relatively thereto, and a motor for moving said valve member over a predetermined range, of valve positioning mechanism including a first tubular member on which said motor is mounted, a second tubular member supported on said valve which is in telescopic relation with said first tubular member, an adjusting member rotatably secured to one of said tubular members and threadedly engaging the other of said members by the rotation of which one of said members may be moved relatively to the other, a pin on one of said members and a guide slot disposed longitudinally in the other of said members with which said pin cooperates to prevent rotation of one of said members in relation to the other when said adjusting member is rotated.

6. In a flow control valve having a body with inlet and outlet openings and a port affording communication between said openings, the combination with a valve member movable relatively to said port for governing flow through said valve, of a motor for moving said valve member over a predetermined range, hand operated means for moving said motor to vary the minimum opening effected thereby, and additional means for limiting the maximum valve opening effected by said motor to a part of the total range of motor operated movement.

7. In a flow control valve having a body with inlet and outlet openings and a port affording communication between said openings, the combination with a valve member movable relatively to said port for governing flow through said valve, of a motor for moving said valve member over a predetermined range, means for moving said motor to vary the minimum valve opening effected thereby, and additional means movable with said motor for limiting the maximum valve opening effected thereby to a part of the total range of motor operated valve movement.

8. In combination with a flow control valve having a control port, a valve member cooperating with said port and adapted to move relatively thereto, and a valve motor, a first member supported on said valve and a second member movable relatively to said first member on which said motor is mounted, means operatively connecting said motor to said valve member for moving said valve member relatively to said port over a predetermined range, means for imparting relative movement to said first and second members to establish a minimum valve opening to which said valve member is moved by said motor, and means associated with said motor for establishing a maximum valve opening to which said valve member is moved by said motor, said means operating to limit the maximum valve opening to a part only of said predetermined total range of motor operated valve movement.

9. In a flow control valve having a body with inlet and outlet openings and a port affording communication therebetween, the combination with a valve member movable in relation to said port for controlling flow through said valve and a reciprocatable stem in operative connection therewith, of a motor for reciprocating said stem, a spacing device including a pair of relatively movable members within which said valve stem is disposed, one of said members being supported by said body and the other of said members supporting said motor, a stop on said stem and a stop on said motor supporting spacing device member within the path of movement of said stem stop, one of which stops is adjustable relatively to the other to establish the limit of valve opening movement effected by said motor, and means affording relative adjustment to said spacing device members to establish the limit of valve closing movement effected by said motor.

10. In a flow control valve having a control port and a valve member movable relatively thereto for governing flow through said valve, a reciprocatable stem in operative connection with said valve member, a motor for reciprocating said stem, a spacing device having a pair of relatively movable members arranged in telescopic relation within which said valve stem is disposed, one of said spacing device members being connected to said valve body and the other of said members serving to support said motor, a stop secured to said valve stem and movable therewith, a collar threaded on said motor supporting spacing device member, a stop associated with said collar and disposed axially of the path of movement of said first stop whereby rotation of said collar serves to adjust the relative positions of said stops to limit the opening movement effected by said motor to said valve member, and means for relatively positioning said spacing device members to limit the closing movement effected by said motor to said valve member.

11. In combination with a flow control valve having a body including a control port, a valve member cooperating with said port and adapted to move relatively thereto, a stem operatively connected to said valve member, a structure defining a diaphragm chamber having a diaphragm connected to said valve member and responsive to changes in operating pressure to vary the position of said valve member in respect to said port in accordance with changes in pressure over a predetermined range of movement, and means for moving said diaphragm chamber, diaphragm and valve member in respect to said port for additionally varying the position of the valve member in respect to said port, said means including a pair of relatively movable members having a non-rotatable sliding connection therebetween, one of which is connected with said body of the control valve and the other of which is connected with said structure defining a diaphragm chamber.

12. In a combined motor and hand-operated valve, the combination with a valve body having a passage therethrough including a port, and a valve member reciprocatable in respect to said port to govern flow through said valve, of a spacing device comprising a first member rigidly secured to said body and a second member having a non-rotatable sliding connection with said first member, a motor-operated means supported on said second spacing device member in direct connection with said valve member for reciprocating said member in respect to said port, and hand-operated means supported on said first spacing device member in indirect connection with said valve member for reciprocating said member in respect to said port, said hand-operated means being in direct connection with said second spacing device member for reciprocating said second intermediate member together with said motor-operated means whereby said motor-operated means may be reciprocated in respect to said valve body and thereby said valve member may be reciprocated in respect to said port.

13. In a combined motor and hand-operated valve, the combination with a valve body having a passage therethrough including a port, and a valve member reciprocatable in respect to said port for governing flow through said valve, of motor operated means in direct connection with said valve member for reciprocating said member in respect to said port, a spacing device including a member secured to said valve body having a tubular portion, and a member on which said motor operated means is supported having a tubular portion, the tubular portions of said spacing device members being arranged in telescopic relation, and hand-operated means in indirect connection with said valve member for reciprocating said member in respect to said port, said hand-operated means being in operative connection with each of said spacing device members whereby said motor-operated means may be reciprocated by said hand-operated means in respect to said valve body and thereby said valve member may be reciprocated in respect to said port.

EDWARD T. DAHL.